United States Patent [19]

Ogawa et al.

[11] Patent Number: 4,741,253

[45] Date of Patent: May 3, 1988

[54] PISTON FOR INTERNAL COMBUSTION ENGINES

[75] Inventors: Yutaka Ogawa; Takayuki Ogasawara; Yoshiaki Hori, all of Nagoya, Japan

[73] Assignee: NGK Insulators, Ltd., Aichi, Japan

[21] Appl. No.: 867,142

[22] Filed: May 27, 1986

[30] Foreign Application Priority Data

May 29, 1985 [JP] Japan ............................... 60-115575

[51] Int. Cl.4 ................................................ F16J 1/04

[52] U.S. Cl. ........................................ 92/212; 92/213; 92/221; 92/224

[58] Field of Search ................. 92/212, 222, 221, 248, 92/213, 220, 224, 254; 123/193 P; 29/156.5 R

[56] References Cited

U.S. PATENT DOCUMENTS

| | | | |
|---|---|---|---|
| 3,000,676 | 9/1961 | Cheney et al. | 92/213 X |
| 3,369,465 | 2/1968 | Harrah | 92/213 X |
| 3,402,644 | 9/1968 | Geiger et al. | 92/213 X |
| 4,404,935 | 9/1983 | Kraft | 92/248 X |
| 4,506,593 | 3/1985 | Sugiyama et al. | 92/224 X |

FOREIGN PATENT DOCUMENTS

| | | | |
|---|---|---|---|
| 3214093 | 10/1983 | Fed. Rep. of Germany | 92/212 |
| 5645134 | 4/1981 | Japan . | |

*Primary Examiner*—Edward K. Look

*Attorney, Agent, or Firm*—Parkhurst & Oliff

[57] ABSTRACT

A piston for internal combustion engines is disclosed, which includes a piston main body of metallic material, and a ceramic piston head member embedded in the top portion of the piston main body. The piston head member is formed on its peripheral surface with one or more extensions of dovetail section protruding radially outwards and having an axially measured thickness which increases toward the outer end thereof. The piston head member is retained in place with a substantially constant retaining force, even during the operation of the engine.

14 Claims, 3 Drawing Sheets

PISTON FOR INTERNAL COMBUSTION ENGINES

BACKGROUND OF THE INVENTION

1. Field of the Invention

The present invention relates to a piston for internal combustion engines, wherein a ceramic piston head member is integrally embedded in the top end portion of a piston main body consisting essentially of metallic material.

2. Description of the Related Art

With the recent progressive development in technology, particularly in the automobile industry and the like, there have been various proposals to devise an internal combustion engine which makes use of ceramic material as extensively as possible, including the provision of a piston with its piston head formed of ceramic material. Such a piston can be produced, for example, by placing a previously prepared ceramic piston head member in a die, and subsequently casting into the die a predetermined amount of molten iron, aluminum alloy, or other suitable metallic material to form a piston main body such that, upon solidification of the cast material, the piston head member forms an integral part of the piston.

Because of low heat conductivity or high heat insulating capacity of ceramic materials, the ceramic piston head member effectively suppresses the transmission of combustion heat to the base material of the piston main body, and thus serves to significantly improve thermal efficiency of the engine. On the other hand, however, when compared with metallic materials, ceramics have a relatively low thermal expansion coefficient, and this results in the metallic material during the solidification being subjected to a higher magnitude of shrinkage, often forming an axial clearance or play between the ceramic piston head member and the base material. With such a clearance or play, the ceramic piston head member cannot be firmly retained in the piston main body, and is liable to separate from the top end portion of the piston main body particularly during the operation of the engine accompanying a reciprocating motion of the piston.

In order to prevent formation of undesirable axial clearance or play between the ceramic piston head member and the piston main body during the casting of the piston, it is known to form an extension of a dovetail section on the lower surface of the ceramic piston head member protruding downwardly therefrom, to establish a form-locking connection between the two elements (refer, for example, to Japanese Utility Model Application Laid-open Publication No. 56-45,134).

When, however, the extension of the dovetail section is formed on the lower surface of the ceramic piston head member in the central region thereof to protrude also radially outwards, the extension is subjected to a severe shearing and/or bending stress during shrinkage of the base material forming the piston main body, and is very liable to be broken during the casting of the piston.

Mechanical failure of the extension of the dovetail section formed on the ceramic piston head member, which takes place during the casting of the piston, can be prevented more or less by arranging the extension on the lower surface of the piston head member around the peripheral region thereof to protrude also radially inwards. This is because the shrinkage of the base material forming the piston main body results in a sliding movement between the two elements along the side surface of the extension, allowing an undisturbed shrinkage of the base material of the piston main body. The piston head member so embedded in the top end portion of the piston main body is tightly retained in place with a predetermined retaining force. However, the above-mentioned arrangement of the piston head member encounters additional serious problems.

That is, when the piston is subsequently subjected to combustion heat during the operation of the engine, the heat is stored in the ceramic piston head member so that the temperature near the piston head approaches the melting point of the base material of the piston main body. Thus, the force for retaining the piston head member in the piston main body decreases considerably. The decrease of such a retaining force also takes place as an axial clearance or play is formed between the piston head member and the piston main body, during operation of the engine. With the decreased retaining force, the piston head member can no longer be retained in place in a stable and reliable manner.

SUMMARY OF THE INVENTION

Therefore, it is an object of the present invention to provide an improved piston with a ceramic piston head member integrally embedded in the top end portion of a piston main body such as to prevent formation of axial clearance or play between the piston head member and the piston main body, and to prevent separation of the two elements from each other during casting or assembly of the piston, or during the operation of the engine.

According to the present invention, there is provided a piston for an internal combustion engine, comprising; a piston main body comprising a metallic material having a substantially cylindrical configuration and a longitudinal central axis, said piston main body having a first end portion; a piston head member comprising a ceramic material, said head member being embedded in said first end portion of the piston main body; said piston head member having a peripheral surface which incudes extension means formed thereon to protrude radially outwards from said piston head member, said extension means having a pair of axially opposite end surfaces, at least one of the end surfaces being in abutting engagement with said piston main body; at least one of the end surfaces of said extension means being inclined with respect to a plane intersected perpendicularly by said longitudinal central axis of the piston main body such that said extension means has an axial thickness which is greater at a radial outermost point than at a radial innermost point.

According to one preferred embodiment of the present invention, each axially opposite end surface of said extension means has a tangent lying in a plane which includes said longitudinal central axis of the piston main body, tangents of each end surface intersecting at a common point on said longitudinal central axis of the piston main body.

DESCRIPTION OF THE PREFERRED EMBODIMENTS

Figure 1:
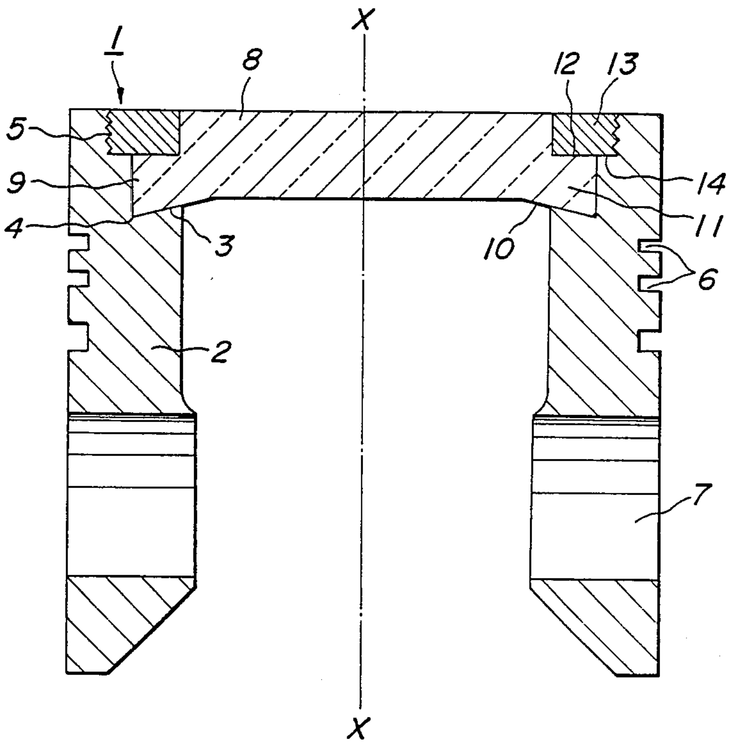
FIG. 1 is a longitudinal sectional view of a piston according to one embodiment of the present invention.

Referring now to the drawings, there is shown in FIG. 1 a piston for internal combustion engines according to one embodiment of the present invention. The piston is designated as a whole by reference numeral 1, and includes a substantially cylindrical piston main body 2 which consists essentially of cast iron, aluminum alloy, or any other suitable metallic material. The piston main body 2 has an open top end portion with an inner surface which defines a stepped recess. More particularly, this recess is circumscribed by a substantially annular-shaped bottom wall 3 as well as first and second inner annular peripheral walls 4 and 5. The bottom wall 3 is inclined with respect to a horizontal plane perpendicularly intersected by the longitudinal axis X—X of the piston 1 such that the bottom wall 3 has a radially inner edge which is raised axially with reference to the radially outer periphery of the bottom wall 3. The first inner peripheral wall 4 has a cylindrical (or annular) configuration, and is arranged adjacent to the bottom wall 3. The second inner peripheral wall 5 is arranged on the upper side of the first inner peripheral wall 4, and is formed with an internal screw thread. The second inner peripheral wall 5 is also annular and has an inner diameter which is slightly larger than that of the first inner peripheral wall 4 (i.e., the wall 5 is radially larger than the wall 4). Furthermore, like conventional pistons, the piston main body 2 of the present invention is formed with a plurality of outer peripheral grooves 6 for piston rings, and a cross-bore 7 for a piston pin. The piston rings and the piston pin are not shown in the drawings.

Figure 2:
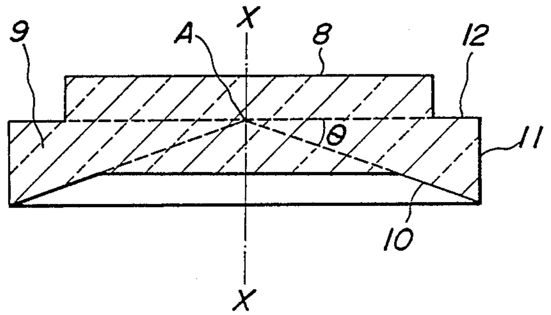
FIG. 2 is a longitudinal sectional view of the ceramic piston head member shown in FIG. 1.

The piston 1 of the present invention further includes a ceramic piston head member 8 which consists essentially of silicon nitride ($Si_3N_4$), silicon carbide (SiC), zirconia ($ZrO_2$), mullite ($3Al_2O_3.2SiO_2$), glass ceramics such as lithium aluminum silicate, magnesium aluminum silicate, etc., or any other suitable ceramic material. As shown in FIG. 1, the piston head member 8 is fitted and embedded in the top end portion of the piston main body 2, and has a radially outwardly protruding extension in the form of a collar 9 with a longitudinal section which is substantially complementary to that of the recess in the piston main body 2. Thus, the collar 9 has an inclined lower surface 10 and a peripheral surface 11 corresponding to the bottom wall 3 and the first inner peripheral wall 4 of the piston main body 2, respectively, as well as a flat upper surface 12 defining a horizontal reference plane with which the inclined lower surface 10 forms an angle $\theta$, as shown in FIG. 2. The arrangement is such that the thickness of the collar 9, i.e. the distance between the upper and lower surfaces 12, 10, increases radially outwards. In other words, the axial thickness of the collar 9 is greater at a radially outermost point than at a radially innermost point on the collar 9.

The above-mentioned angle $\theta$ is determined such that formation of axial clearance between the piston main body 2 and the piston head member 8 can be prevented, regardless of the thermal expansion coefficient and mechanical strength of the ceramic material. To this end, as shown in FIG. 2, the upper and lower surfaces 12, 10 of the collar 9 have tangents lying in a vertical plane which includes the longitudinal axis X—X of the piston, and intersecting each other at a point A on the longitudinal axis X—X. In the embodiment shown in FIGS. 1 and 2, this point A lies in the horizontal reference plane defined by the flat upper surface 12 of the collar 9, which reference plane is perpendicularly intersected by the longitudinal axis X—X.

In the embodiment shown in FIG. 1, the piston 1 further includes a retainer ring member 13 threaded into the top end portion of the piston main body 2. The retainer ring member 13 has an external screw thread corresponding to the thread on the second inner peripheral surface 5 of the piston main body 2, and a lower surface 14 urged against the upper surface 12 of the collar 9 of the piston head member 8.

Figure 3A:
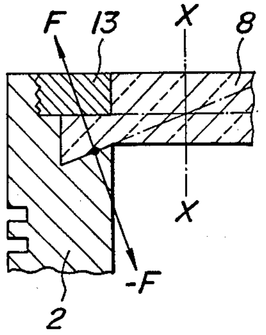
FIGS. 3A, 3B and 3C are diagrams showing the functional advantages of the present invention.
Figure 3B:
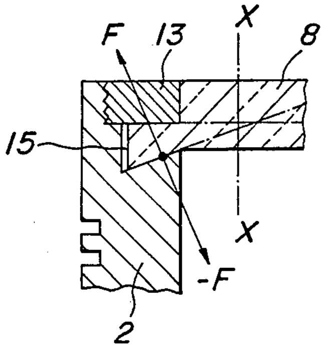

With the above-mentioned arrangement, the retainer ring member 13 threaded into the top end portion of the piston main body 2 serves to stably retain the piston head member 8 with a predetermined, substantially constant retaining force. The retainer ring member 13 in combination with the first inner peripheral wall 4 and the bottom wall 3 forms an annular groove. The piston 1 is shown in FIG. 3A as being under a room temperature condition in which it is not heated by high temperature combustion gas of an engine. When, during the operation of the engine, the piston 1 is subjected to the combustion gas and heated thereby to a temperature of as high as approximately 800° C., in case of a diesel engine, for example, as shown in FIG. 3B, the above-mentioned arrangement of the present invention permits a radial thermal expansion of the piston main body 2 relative to the piston head member 8. The radial thermal expansion is due to the difference in the thermal expansion coefficient of the metallic material and that of the ceramic material, whereby a radial clearance 15 is formed between the two elements 2, 8, while preventing formation of an axial clearance therebetween.

Figure 3C:
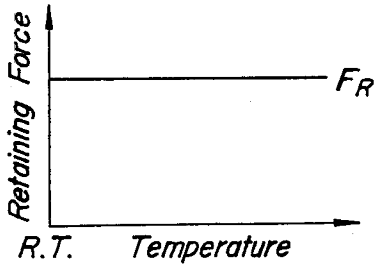

More particularly, the above-mentioned radial thermal expansion of the piston main body 2 relative to the piston head member 8 accompanies relative sliding movement between the lower surface of the retainer ring member 13 and the upper surface 12 of the collar 9, and between the lower surface 10 of the collar 9 and the bottom wall 3 of the recess in the piston main body 2. As a result, the retaining force $F_R$ in the room temperature condition (R.T.), which is applied to axially retain the piston head member 8 in the top end portion of the piston main body 2, remains substantially unchanged regardless of the elevated temperature to which the piston is exposed during the operation of the engine, as shown in FIG. 3C. Thus, it is possible to prevent the formation of any axial clearance or play between the piston head member 8 and the piston main body 2.

Moreover, the angle $\theta$ formed between the upper and lower surfaces 12, 10 of the collar 9, as shown in FIG. 2, may be determined by taking into consideration various design parameters as follows:

(i) size and configuration of the ceramic piston head member,
(ii) thermal expansion coefficient of the ceramic material and metallic material,
(iii) compression stress to which the ceramic piston head member is subjected,
(iv) temperature to which the piston is subjected, and
(v) high temperature strength of the ceramic material and metallic material, etc.

Thus, for example, the angle θ between the two end surfaces 10, 12 of the collar 9 may be smaller when there is a small diference in thermal expansion coefficients between the ceramic material of the piston head member 8 and the metallic material of the piston main body 2, and may be greater when there is a large difference in thermal expansion coefficient, so long as the ceramic material has a sufficient high temperature strength.

Figure 4:
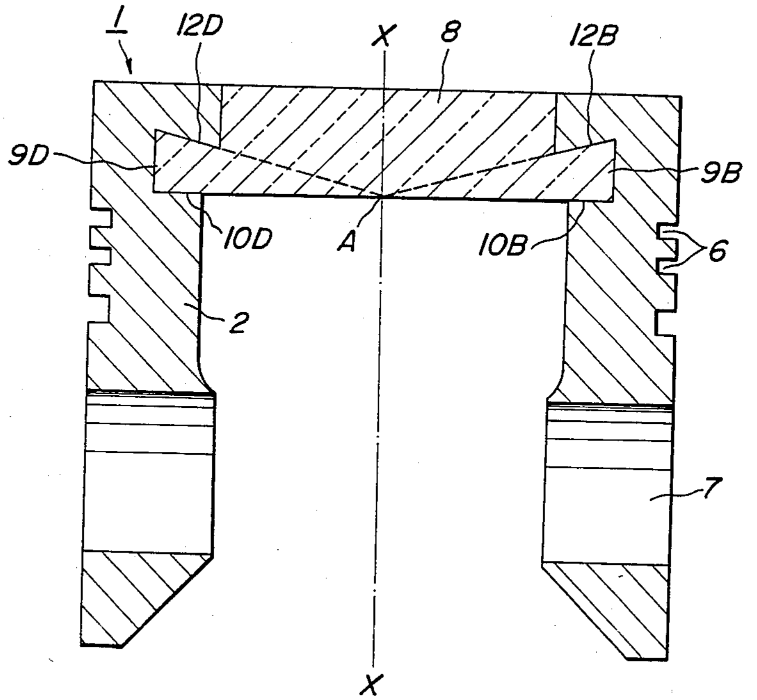
FIG. 4 is a longitudinal sectional view of a piston according to another embodiment of the present invention.
Figure 5:
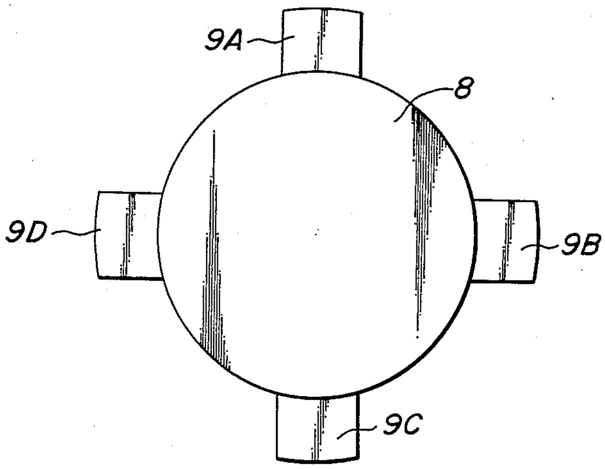
FIG. 5 is a top plan view of the ceramic piston head member shown in FIG. 4.

Another embodiment of the present invention is shown in FIGS. 4 and 5, wherein like numerals are used to denote the same or equivalent elements. This embodiment differs from the first embodiment shown in FIGS. 1 and 2, in that a previously prepared ceramic piston head member 8 is integrally embedded into an annular groove in the top end portion of the piston main body 2 during the casting of the latter. Instead of a single collar 9 shown in FIGS. 1 and 2, the piston head member 8 has formed on its periphery with four extensions 9A, 9B, 9C and 9D, which may be arranged at an equiangular distance from each other, to protrude radially outward from the piston head member 8. Each extension 9A, 9B, 9C, 9D has a flat lower surface 10A, 10B, 10C, 10D, and an upper surface 12A, 12B, 12C, 12D inclined with respect to the lower surface so as to provide an axially measured thickness which increases radially outwards.

In this embodiment, the ceramic piston head member 8 is applied with an initial retaining force during the solidification of molten metallic material cast into the die, whereby the metallic material is subjected to shrinkage and tightly urged against the outer surfaces of the extensions 9A, 9B, 9C, 9D. This shrinkage accompanies sliding movement of the metallic material along the upper and lower surfaces of the extensions, so that the extensions are prevented from being subjected to severe stresses during the casting of the piston.

Otherwise, the embodiment shown in FIGS. 4 and 5 provides all the functional advantages of the previous embodiment. Thus, even when the piston is subjected to the combustion gas of the engine, and heated to a temperature near the melting point of the metallic material forming the piston main body, the ceramic piston head member is retained in the top end portion of the piston main body with a substantially constant retaining force.

It will be appreciated that, according to the present invention, the ceramic piston head member is integrally embedded in the top end portion of the piston main body so as to prevent formation of an undesirable axial clearance or play between the two elements, during the operation of the engine. Thus, it is possible to prevent separation of the piston head member from the piston main body. Furthermore, when the piston head member is integrally embedded in the piston main body during the casting of the latter, the piston head member is protected from breakage due to the shrinkage of the metallic material forming the piston main body.

While the present invention has been described with respect to certain preferred embodiments, by way of example, it is apparent that various modifications and alterations may be made without departing from the scope of the present invention. For example, the top surface of the piston head member, which has been shown in FIGS. 1 and 4 as being a flat surface, may be recessed to define part of the combustion chamber. Furthermore, the collar or extensions protruding radially outwardly from the peripheral surface of the piston head member need not be arranged adjacent to the lower surface of the piston head member, and may be arranged in an axially central region of the piston head member spaced from both end surfaces thereof. Moreover, both end surfaces of the collar or extensions may be inclined with respect to a reference plane which is perpendicularly intersected by the longitudinal axis of the piston. These and other variations, providing various useful functional advantages as mentioned above, are well encompassed within the scope of the present invention.

What is claimed is:

1. A piston for an internal combustion engine, comprising:

a piston main body comprising a metallic material having a substantially cylindrical configuration and a longitudinal central axis, said piston main body having a first end portion;

a piston head member comprising a ceramic material, said head member being embedded in said first end portion of the piston main body;

said piston head member having a peripheral surface which includes extension means formed thereon and protruding radially outward therefrom, said extension means having a pair of axially opposite end surfaces, at least one of the end surfaces being in abutting engagement with said piston main body; and at least one of the end surfaces of said extension means being inclined with respect to a plane intersected perpendicularly by said longitudinal central axis of the piston main body, wherein each axially opposite end surface of said extension means has a tangent lying in a plane which includes said longitudinal central axis of the piston main body, said tangents intersecting at a common point on said longitudinal central axis of the piston main body, such that said extension means has an axial thickness which is greater at a radial outermost point than at a radial innermost point.

2. The piston as claimed in claim 1, wherein said extension means comprises a collar which extends along the entire periphery of said piston head member.

3. The piston as claimed in claim 1, wherein said extension means comprises a plurality of projections arranged on the periphery of said piston head member.

4. The piston as claimed in claim 3 wherein said plurality of projections are placed an equiangular distance from each other around the periphery of said piston head member.

5. The piston as claimed in claim 1 wherein a first of said pair of axially opposite end surfaces of the extension means is in abutting engagement with said piston main body, and a second of said pair of axially opposite end surfaces contacts a retainer ring member threadedly connected to said end portion of the piston main body.

6. The piston as claimed in claim 1 wherein said first end portion of the piston main body comprises an open end portion.

7. The piston as claimed in claim 6 wherein said open end portion includes an annular groove, into which said at least one extension means is located.

8. A piston for an internal combustion engine, comprising:

a substantially cylindrical piston main body comprising a metallic material, said piston body having a first end portion and a second end portion and at least one annular groove located closer to said first end portion than said second end portion, said piston main body having a longitudinal central axis passing therethrough; and a piston head member comprising a ceramic material and having a first axial end portion and a second axial end portion, said piston head member including an extension means located on an outer peripheral portion thereof, said extension means extending radially outward from said piston head member and including a first axial end surface and a second axial end surface, at least said first axial end surface being in abutting engagement with said at least one annular groove and at least one of said first and second axial end surfaces being inclined with respect to a plane which perpendicularly intersects said longitudinal central axis of the piston main body, wherein each axially opposite end surface of said extension means has a tangent lying in a plane which includes said longitudinal central axis of the piston main body, said tangents intersecting at a common point on said longitudinal central axis of the piston main body, such that said extension means has an axial thickness which is greater at a radially outermost point than at a radial innermost point.

9. The piston as claimed in claim 8 wherein said extension means comprises a collar which extends along the entire periphery of said piston head member.

10. The piston as claimed in claim 8 wherein said extension means comprises a plurality of projections arranged on the periphery of said piston head member.

11. The piston as claimed in claim 10 wherein said plurality of projections are placed an equiangular distance from each other around the periphery of said piston head member.

12. The piston as claimed in claim 8 wherein both said first and said second axial end surfaces of the extension means are in abutting engagement with said at least one annular groove.

13. The piston as claimed in claim 8 wherein said at least one annular groove is formed from a first annular portion cut out from said piston main body, a second annular portion cut out from said piston main body, said second annular portion being radially larger than said first annular portion and being closer to said first end portion of the piston main body than said first annular portion and a retainer ring member threadedly connecting with said second annular portion.

14. The piston as claimed in claim 13 wherein said first axial end surface of the extension means is in abutting contact with said first annular portion and said second axial end surface of the extension means is in abutting contact with said retainer ring member.

* * * * *